US012716479B2

(12) United States Patent
Strasser

(10) Patent No.: US 12,716,479 B2
(45) Date of Patent: Aug. 25, 2026

(54) SPLINE TOOTHING BETWEEN RING GEAR AND HOUSING PART

(71) Applicant: ZF FRIEDRICHSHAFEN AG, Friedrichshafen (DE)

(72) Inventor: Dirk Strasser, Breckerfeld (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/716,951

(22) PCT Filed: Nov. 7, 2022

(86) PCT No.: PCT/EP2022/080956
§ 371 (c)(1),
(2) Date: Jun. 6, 2024

(87) PCT Pub. No.: WO2023/104411
PCT Pub. Date: Jun. 15, 2023

(65) Prior Publication Data

US 2025/0043858 A1 Feb. 6, 2025

(30) Foreign Application Priority Data

Dec. 10, 2021 (DE) ..................... 10 2021 214 121.8

(51) Int. Cl.
*F16H 57/023* (2012.01)
*F16H 55/17* (2006.01)
*F16H 57/08* (2006.01)

(52) U.S. Cl.
CPC ........... *F16H 57/023* (2013.01); *F16H 55/17* (2013.01); *F16H 2055/176* (2013.01); *F16H 57/08* (2013.01)

(58) Field of Classification Search
CPC ..................... F16H 2055/176; F16H 2055/173
See application file for complete search history.

(56) References Cited

U.S. PATENT DOCUMENTS

| | | | | |
|---|---|---|---|---|
| 2005/0126240 | A1* | 6/2005 | Waldert | B23P 15/14 72/51 |
| 2006/0205560 | A1* | 9/2006 | Meier | F16H 55/17 475/331 |
| 2010/0292043 | A1 | 11/2010 | Tao et al. | |
| 2010/0311537 | A1* | 12/2010 | Ziemer | F16H 55/17 475/331 |
| 2014/0135165 | A1 | 5/2014 | Kruselburger | |
| 2017/0059030 | A1 | 3/2017 | Mckinzie | |
| 2017/0241485 | A1* | 8/2017 | Piper | F16D 1/116 |
| 2018/0306301 | A1* | 10/2018 | Schneider | F16H 57/08 |

(Continued)

FOREIGN PATENT DOCUMENTS

| | | | | |
|---|---|---|---|---|
| DE | 102007054764 | A1 * | 5/2009 | F16H 55/17 |
| DE | 102014203630 | A1 | 9/2015 | |
| DE | 102015215173 | A1 | 2/2017 | |

(Continued)

*Primary Examiner* — Daniel D Yabut
(74) *Attorney, Agent, or Firm* — LEYDIG, VOIT & MAYER, LTD.

(57) ABSTRACT

A gearbox arrangement, including a ring gear, a housing part, and a mating toothing. The mating toothing connects the ring gear and the housing part to each other in a non-rotational manner. The ring gear and the housing part each form a toothing of the mating toothing in one piece.

6 Claims, 1 Drawing Sheet

(56) References Cited

U.S. PATENT DOCUMENTS

2020/0056679 A1* 2/2020 Sperlich .................. F16H 57/08

FOREIGN PATENT DOCUMENTS

| | | | | |
|---|---|---|---|---|
| DE | 102016216195 | A1 | | 3/2017 |
| DE | 102018131838 | A1 | | 6/2020 |
| DE | 102019117164 | A1 | | 12/2020 |
| DE | 102019214095 | A1 | | 3/2021 |
| DE | 102021204274 | A1 | * | 11/2022 |
| EP | 2730807 | A1 | | 5/2014 |
| JP | 2009057996 | A | | 3/2009 |
| JP | 2017190837 | A | | 10/2017 |

* cited by examiner

SPLINE TOOTHING BETWEEN RING GEAR AND HOUSING PART

CROSS REFERENCE TO RELATED APPLICATIONS

This application is a U.S. National Phase application under 35 U.S.C. § 371 of International Application No. PCT/EP2022/080956, filed on Nov. 7, 2022, and claims benefit to German Patent Application No. DE 10 2021 214 121.8, filed on Dec. 10, 2021. The International Application was published in German on Jun. 15, 2023 as WO 2023/104411 A1 under PCT Article 21(2).

FIELD

The invention relates to a gearbox arrangement.

BACKGROUND

U.S. Pat. No. 2,014,135 165 A1 describes a ring gear that extends over two planetary stages. The planetary stage with the smaller module is coupled to the ring gear via an insert ring. The insert ring forms a mating toothing with a working toothing of the ring gear, by means of which the insert ring is fixed non-rotatably in the ring gear. The insert ring in turn forms a working toothing for the planetary stage with the smaller module.

SUMMARY

In an embodiment, the present disclosure provides a gearbox arrangement, comprising a ring gear, a housing part, and a mating toothing. The mating toothing connects the ring gear and the housing part to each other in a non-rotational manner. The ring gear and the housing part each form a toothing of the mating toothing in one piece.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
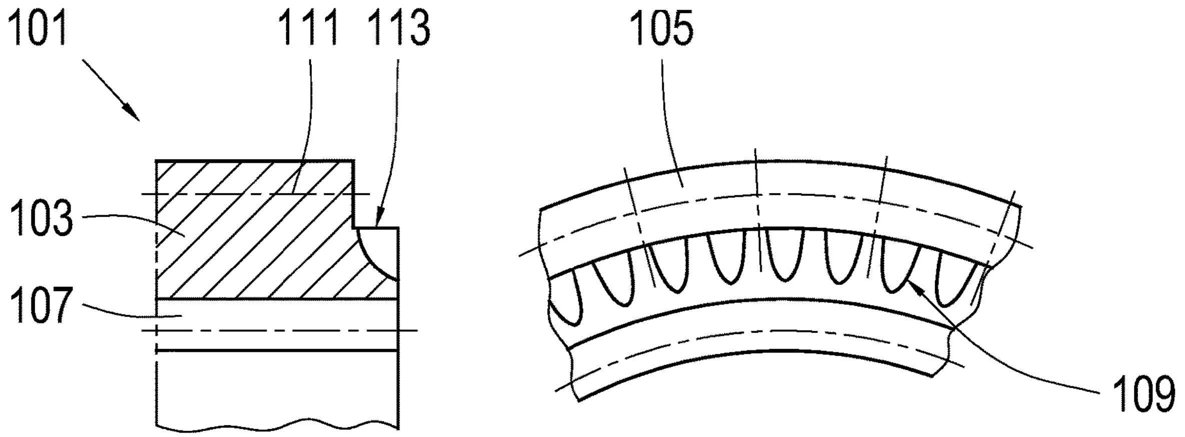
FIG. 1 illustrates a first gearbox arrangement.

In an embodiment, the invention provides improvements for the fixing of a ring gear in a gearbox housing.

A gearbox arrangement refers to an arrangement that is configured for use as part of a gearbox, preferably a wind power gearbox. In particular, the gearbox arrangement can be identical to the gearbox.

The gearbox arrangement according to an embodiment of the invention comprises a housing part, a ring gear and a mating toothing. A housing part refers to a part of a gearbox housing. At least one part of the housing part forms a wall of the gearbox housing. The wall is characterized by the fact that it separates the interior of the gearbox from its exterior. Accordingly, one surface of the wall adjoins the interior of the gearbox, i.e. a cavity within the gearbox that contains the gearbox's internals, in particular its gears and shafts. A further surface of the wall is located outside the gearbox and accordingly adjoins the outside of the gearbox, i.e. the surroundings of the gearbox located outside the gearbox. The wall extends between the two surfaces mentioned.

A ring gear refers to a gear with internal toothing. In particular, the ring gear can be configured as part of a planetary stage. In addition to the ring gear, the planetary stage comprises a planet carrier, one or more planet gears and a sun gear. The planet gears are rotatably mounted in the planet carrier and mesh with the ring gear and/or the sun gear, respectively.

A mating toothing refers to a multiple drive-type connection consisting of two individual toothings. The toothings engage with each other so that they are connected to each other in a non-rotational manner. In the present case, the mating toothing connects the housing part and the ring gear to each other in a non-rotational manner.

According to an embodiment of the invention, the housing part and the ring gear each form integrally one of the toothings of the mating toothing. This means that the housing part forms at least one toothing that is integrated as one piece in the housing part. Accordingly, the ring gear forms at least one toothing that is integrated as one piece in the ring gear. The toothing of the housing part and the toothing of the ring gear engage with each other in such a way that they are connected to each other in a non-rotational manner. Thus a non-rotatable connection between the housing part and the ring gear is created, which is characterized by its simplicity and high load-bearing capacity.

In some embodiments, the teeth of the mating toothing, i.e. the teeth of the toothing of the housing part and the teeth of the toothing of the ring gear, run radially or axially with respect to a central axis of the ring gear, which is identical to an axis of rotation of the planet carrier and of the sun gear of the same gear stage.

The arrangement is preferably configured in such a way that a working toothing of the ring gear forms the toothing of the ring gear which is part of the mating toothing. Accordingly, the toothing of the housing part engages with the working toothing of the ring gear. The working toothing refers to a toothing with which the planet gears of the same planetary stage mesh. The further development simplifies the construction of the mating toothing, as only the toothing of the housing part has to be manufactured separately.

In an embodiment, the mating toothing is configured as spline toothing, Hirth-toothing or rectangular toothing.

In an embodiment, one or more screw connections are provided for fixing the mating toothing. Due to the screw connections, the housing part and the ring gear are axially braced against each other in the mating toothings. The screw connections therefore each exert a force in the axial direction on the housing part and the ring gear, i.e. a force that runs parallel to the central axis of the ring gear. The force causes the housing part and the ring gear to be braced against each other in the mating toothing.

Figure 2:
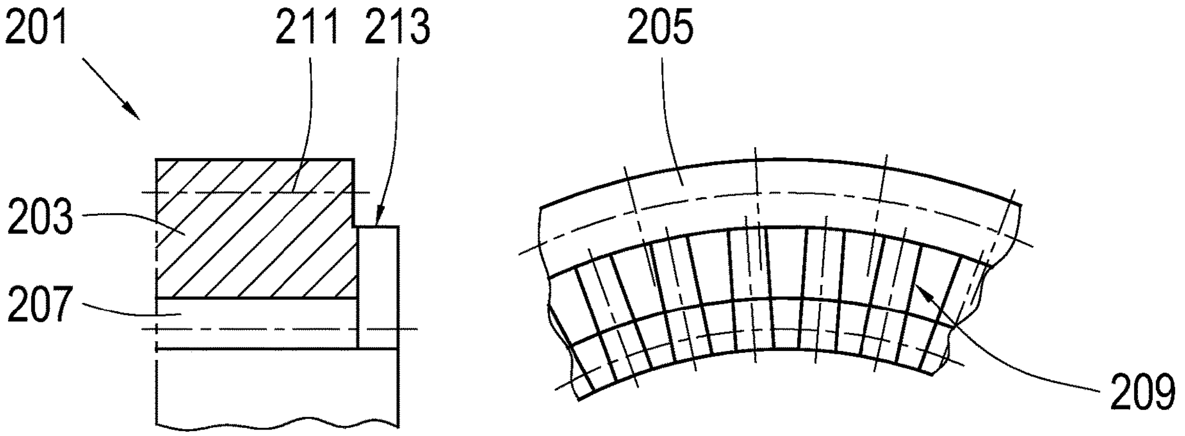
FIG. 2 illustrates a second gearbox arrangement.
Figure 3:
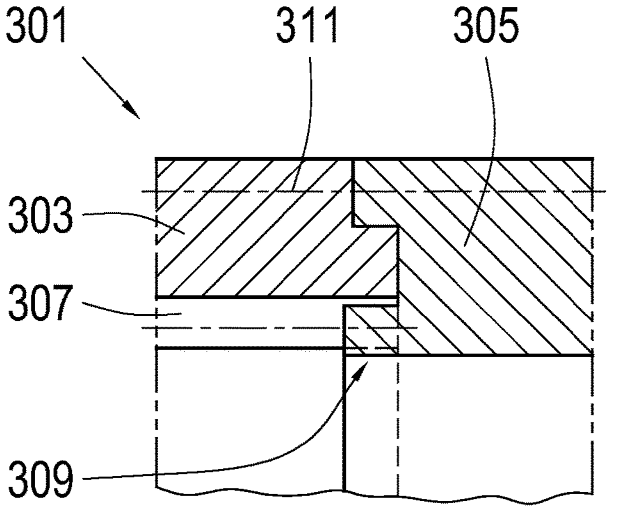
FIG. 3 illustrates a third gearbox arrangement.

FIGS. 1, 2 and 3 each show a gearbox arrangement 101, 201, 301 with a ring gear 103, 203, 303 and a housing part 105, 205, 305. The ring gear 103 forms a working toothing 107, 207, 307. This surrounds a central axis of the ring gear 103, 203, 303 in the circumferential direction and meshes with planet gears.

The housing part 105, 205, 305 has a toothing 109, 209, 309. This engages with a corresponding toothing of the ring gear 103, 203, 303 and thus forms a non-rotational connection between the ring gear 103, 203, 303 and the housing part 105, 205, 305.

The ring gear 103, 203, 303 is fixed in the housing part 105, 205, 305 by means of screws 111, 211, 311. The screws 111, 211, 311 run axially, i.e. parallel to the central axis of the ring gear 103, 203, 303. Accordingly, the ring gear 103, 203, 303 and the housing part 105, 205, 305 are secured relative to each other against displacement in the axial direction by the screws 111, 211, 311.

The toothing 109 of the housing part 105 shown in FIG. 1 runs in an axial direction and is configured as internal toothing. The toothing 109 engages with a toothing 113 of the ring gear 103, which is configured as external toothing, and forms a mating toothing with this. The toothings 109 of the housing part 105 and 113 of the ring gear 103 are configured as spline toothings.

The toothing 209 of the ring gear 205 and a corresponding toothing 213 of the sun gear 203 run in a radial direction as shown in FIG. 2. Both toothings 209, 213 can, as shown in FIG. 2, be configured as spline toothing or alternatively as rectangular toothing or Hirth-toothing.

In the gearbox arrangement 301 shown in FIG. 3, the ring gear 303 has no further toothing in addition to the working toothing 307. Instead, the toothing 309 of the housing part 305 engages with the working toothing 307. In this way a non-rotational connection is created between the working toothing 307 and the toothing 309 of the housing part 305.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMBERS

101 gearbox arrangement
103 ring gear
105 housing part
107 working toothing
109 toothing
111 screw
113 toothing
201 gearbox arrangement
203 ring gear
205 housing part
207 working toothing
209 toothing
211 screw
213 toothing
301 gearbox arrangement
303 ring gear
305 housing part
307 working toothing
309 toothing
311 screw

The invention claimed is:

1. A gearbox arrangement, comprising:
a ring gear;
a housing part; and
a mating toothing,
wherein the mating toothing connects the ring gear and the housing part to each other in a non-rotational manner,
wherein the ring gear and the housing part each form a toothing of the mating toothing in one piece,
wherein the ring gear is fixed in the housing part using one or more screws,
wherein the one or more screws run axially parallel to a central axis of the ring gear, and
wherein the housing part and the ring gear are axially braced against each other by the one or more screws such that the housing part and the ring gear axially abut each other.

2. The gearbox arrangement according to claim 1, wherein teeth of the mating toothing run radially.

3. The gearbox arrangement according to claim 1, wherein teeth of the mating toothing run axially.

4. The gearbox arrangement according to claim 3, wherein a working toothing of the ring gear forms the toothing of the mating toothing.

5. The gearbox arrangement according to claim 1, wherein the mating toothing is configured as a spline toothing, Hirth-toothing or rectangular toothing.

6. A gearbox arrangement, comprising:
a ring gear;
a housing part; and
a mating toothing,
wherein the mating toothing connects the ring gear and the housing part to each other in a non-rotational manner,
wherein the ring gear and the housing part each form a toothing of the mating toothing in one piece,
wherein teeth of the mating toothing run axially,
wherein a working toothing of the ring gear forms the toothing of the mating toothing, and
wherein the housing part and the ring gear are axially braced against each other by the one or more screws such that the housing part and the ring gear axially abut each other.

* * * * *